United States Patent
Hayward et al.

(10) Patent No.: US 6,746,626 B2
(45) Date of Patent: Jun. 8, 2004

(54) GRAPHITE POLYMERS AND METHODS OF USE

(75) Inventors: Tommie P. Hayward, Saugus, CA (US); Mike G. Roemmler, Los Angeles, CA (US)

(73) Assignee: SGL Technic Inc., Valencia, CA (US)

( * ) Notice: Subject to any disclaimer, the term of this patent is extended or adjusted under 35 U.S.C. 154(b) by 162 days.

(21) Appl. No.: 09/833,458

(22) Filed: Apr. 11, 2001

(65) Prior Publication Data

US 2003/0205697 A9 Nov. 6, 2003

Related U.S. Application Data (63) Continuation-in-part of application No. 09/790,822, filed on Feb. 21, 2001, which is a continuation of application No. 09/270,900, filed on Mar. 15, 1999, now Pat. No. 6,217,800, which is a continuation-in-part of application No. 08/724,177, filed on Sep. 30, 1996, now Pat. No. 5,882,570, which is a continuation-in-part of application No. 08/591,363, filed on Jan. 25, 1996, now Pat. No. 5,582,781, which is a continuation of application No. 08/262,743, filed on Jun. 20, 1994, now abandoned.

(51) Int. Cl.$^7$ ............................... H01B 1/00; C08K 3/04
(52) U.S. Cl. ........................ 252/511; 252/500; 252/502; 264/464; 264/478; 264/328.18
(58) Field of Search ..................... 252/500, 502, 252/511; 264/328.1, 328.6, 328.16, 331.11, 349; 524/495; 523/137

(56) References Cited

U.S. PATENT DOCUMENTS

| | | | |
|---|---|---|---|
| 1,137,373 A | 4/1915 | Aylsworth | |
| 1,171,090 A | 2/1916 | Cook | |
| 1,325,950 A | 12/1919 | McClure | |
| 1,695,682 A | 12/1928 | Creamer | |
| 1,897,088 A | 2/1933 | Victor | |
| 1,904,651 A | 4/1933 | Victor | |
| 1,911,484 A | 5/1933 | Victor | |
| 1,927,450 A | 9/1933 | Balfe | |
| 1,968,365 A | 7/1934 | Bailey | |
| 1,997,987 A | 4/1935 | Victor, Jr. | |
| 2,006,381 A | 7/1935 | Bailey | |

(List continued on next page.)

FOREIGN PATENT DOCUMENTS

| | | | |
|---|---|---|---|
| EP | 0332122 A2 | 9/1989 | |
| EP | 332122 | * 9/1989 | ............. F21V/7/22 |
| EP | 0623782 A2 | 11/1994 | |
| GB | 2363120 A | 12/2001 | |
| JP | 49099986 A | 9/1974 | |
| JP | 63098964 A | 4/1988 | |
| JP | 2000-95947 | 4/2000 | |
| WO | WO 00/54953 | 9/2000 | |

OTHER PUBLICATIONS

Database WPI, Section Ch, Week 200027, Derwent Publications Ltd., London, GB; Class A23, AN 2000–313079 XP002207958 and JP 2000 095947 A (Unitika Ltd), Apr. 4, 2000, Abstract.

*Primary Examiner*—Yogendra N. Gupta
*Assistant Examiner*—Kallambella M Vijayakumar
(74) *Attorney, Agent, or Firm*—Blakely Sokoloff Taylor & Zafman LLP (57) ABSTRACT

A method and apparatus comprising expanded, or flexible, graphite mixed into a polymer material is disclosed. A method for using expanded graphite that has been pre-compressed prior to milling to enable a polymer material to accept an electrostatic modification to the surface or to dissipate electrostatic discharges. Other embodiments relate to methods of making polymer materials, methods of making molded polymer articles or objects, and methods of electrostatically modifying molded conductive polymer materials.

35 Claims, 7 Drawing Sheets

U.S. PATENT DOCUMENTS

| | | |
|---|---|---|
| 2,029,302 A | 2/1936 | Balfe |
| 2,056,854 A | 10/1936 | Hene |
| 2,211,045 A | 8/1940 | Balfe |
| 2,930,106 A | 3/1960 | Wrotnowski |
| 2,992,151 A | 7/1961 | Niessen |
| 3,061,656 A | 10/1962 | Chappell |
| 3,333,941 A | 8/1967 | Olstowski et al. |
| 3,341,211 A | 9/1967 | Houghton et al. |
| 3,389,964 A | 6/1968 | Olstowski et al. |
| 3,403,595 A | 10/1968 | Watson |
| 3,404,061 A | 10/1968 | Shane et al. |
| 3,414,381 A | 12/1968 | Olstowski et al. |
| 3,423,496 A | 1/1969 | Olstowski et al. |
| 3,431,970 A | 3/1969 | Olstowski et al. |
| 3,494,382 A | 2/1970 | Shane et al. |
| 3,560,155 A | 2/1971 | Olstowski et al. |
| 3,718,720 A | 2/1973 | Lambdin, Jr. et al. |
| 3,885,007 A | 5/1975 | Olsen et al. |
| 3,970,322 A | 7/1976 | Stecher et al. |
| 4,042,747 A | 8/1977 | Breton et al. |
| 4,068,853 A | 1/1978 | Schnitzler |
| 4,075,114 A | 2/1978 | Ishikawa et al. |
| 4,146,401 A | 3/1979 | Yamada et al. |
| 4,234,638 A | 11/1980 | Yamazoe et al. |
| 4,391,787 A | 7/1983 | Tibbetts |
| 4,491,569 A | 1/1985 | Tibbetts |
| 4,497,788 A | 2/1985 | Bradley et al. |
| 4,565,649 A | 1/1986 | Vogel |
| 4,565,684 A | 1/1986 | Tibbetts et al. |
| 4,591,170 A | 5/1986 | Nakamura et al. |
| 4,705,722 A | 11/1987 | Ueda et al. |
| 4,748,075 A | 5/1988 | Beyer et al. |
| 4,749,557 A | 6/1988 | Yetter et al. |
| 4,752,518 A | 6/1988 | Lohrke et al. |
| 4,776,602 A | 10/1988 | Gallo |
| 4,822,062 A | 4/1989 | Gallo et al. |
| 4,852,893 A | 8/1989 | Wesley |
| 4,895,713 A | 1/1990 | Greinke et al. |
| 4,908,169 A | 3/1990 | Galic et al. |
| 4,971,726 A * | 11/1990 | Maeno et al. ............... 252/511 |
| 5,024,818 A | 6/1991 | Tibbetts et al. |
| 5,130,199 A | 7/1992 | Howard |
| 5,134,030 A | 7/1992 | Ueda et al. |
| 5,172,920 A | 12/1992 | Schlenk |
| 5,225,262 A | 7/1993 | Leduc |
| 5,370,405 A | 12/1994 | Ueda |
| 5,374,415 A | 12/1994 | Alig et al. |
| 5,382,384 A | 1/1995 | Baigrie et al. |
| 5,389,400 A | 2/1995 | Ting et al. |
| 5,395,126 A | 3/1995 | Tresslar |
| 5,413,773 A | 5/1995 | Tibbetts et al. |
| 5,433,906 A | 7/1995 | Dasch et al. |
| 5,482,798 A | 1/1996 | Mototani et al. |
| 5,499,826 A | 3/1996 | Pippert et al. |
| 5,500,471 A * | 3/1996 | Uota .......................... 524/262 |
| 5,611,964 A | 3/1997 | Friend et al. |
| 5,882,570 A * | 3/1999 | Hayward ............... 264/328.18 |

* cited by examiner

GRAPHITE POLYMERS AND METHODS OF USE

This Application is a Continuation-In-Part of U.S. application Ser. No. 09/790,822, filed Feb. 21, 2001; which is a Continuation of U.S. application Ser. No. 09/270,900, filed Mar. 15, 1999 (now U.S. Pat. No. 6,217,800); which is a Continuation-In-Part of U.S. application Ser. No. 08/724,177, filed Sep. 30, 1996 (now U.S. Pat. No. 5,882,570); which is a Continuation-In-Part of U.S. application Ser. No. 08/591,363, filed Jan. 25, 1996 (now U.S. Pat. No. 5,582,781); which is a continuation of U.S. application Ser. No. 08/262,743 filed on Jun. 20, 1994 (abandoned): as prior applications for which the pending application claims the benefit.

BACKGROUND

1. Field of the Invention

Graphite containing polymer material.

2. Related Art

In the prior art various forms of graphite material have been used to enable polymer material to conduct or dissipate electrostatic charge. One of the first such graphite containing materials added to polymers was carbon black which has an appropriate amount of electrostatic dissipative capacity, but is difficult to handle, relatively light and extremely time consuming to put in place.

Static electricity and electrostatic discharge (ESD) are naturally occurring phenomena. Simply stated static electricity is electrical energy at rest on a surface. It is generally created by the rubbing together and separating of two materials, one of which is usually non-conductive. Typically, one material gives up electrons and becomes positively charged; the other material takes on electrons and becomes negatively charged. ESD may be characterized as the sudden discharge of electrostatic potential from one body to another. A good example may be the shock one may receive when touching a metal door after walking across a carpeted floor.

In many environments, ESD may damage or destroy sensitive electronic components, erase or alter magnetic media, or set off explosions or fires in flammable environments. These discharges may be caused by a variety of sources; most commonly there is a direct discharge from a person or equipment into a sensitive object.

One way of preventing ESD is to reduce the generation of charges in the first place. A second way of preventing ESD is to provide a ground path for the safe dissipation of accumulated charges to ground before they can build up to a level that is harmful to sensitive equipment. A third method is to provide shielding or protection of devices and equipment from discharge through packaging. ESD may also be controlled with materials, such as conductive plastics, that do not generate high levels of charge, dissipate charges before they can accumulate at dangerous levels, or that provide electrostatic shielding to prevent charges from reaching the sensitive device.

Floors of clean rooms that need to have low electrostatic discharge potential for, as an example, manufacturing semiconductor devices, need to be conductive and lightweight. These floors require lightweight floor panels, because they tend to be suspended on vibration dampening mechanisms. A lightweight, conductive polymer that dissipates electrostatic charges before they build up to dangerous levels would be useful.

Other applications for ESD polymer materials are as computer covers and chip trays. Computer covers that offer ESD protection will protect delicate computer components on the inside from harmful electrostatic discharges. Chip trays are used to move and store semiconductor circuits during dicing, testing and packaging operations. These operations are generally when sensitive integrated circuits are most vulnerable to ESD. An electrostatic dissipative chip tray allows electrostatic charges to bleed off before they build up to dangerous levels that could harm an isolated integrated circuit chip.

U.S. Pat. No. 5,582,781 discloses, inter alia, a method of making graphite foam material. Expanded graphite is made from flexible graphite foil. The expanded graphite is then compounded into sheets to make insulation material.

U.S. Pat. No. 5,882,570 discloses, inter alia, a method of injection molding graphite and a thermoplastic material. This method also uses 45 to 60 percent by weight expanded graphite. The compound of thermoplastic material and re-expanded graphite is fed into a molding system (e.g. injection molding system) at relatively high temperature and injected into a mold where a plastic material is formed. The material is valuable for its heat conducting capacity for use in for example, thermal management.

Many parts of automobiles are painted using an electrostatic painting scheme. Electrostatic painting increases the uniformity with which the applied paint covers the part that is painted compared with plain spray painting. Paint in the form of small droplets or a fine powder is given an electrical charge, while the part to be painted is given the opposite charge. The charge differential impels the paint toward the part to be painted. When the paint touches the part the charge differential is neutralized allowing the paint to adhere to the part.

For this electrostatic paint scheme to work the part to be painted must be able to hold or dissipate a charge. When the part is a non-conductive polymer, a conductive primer must be coated over the part to enable the paint to uniformly cover the part. This primer generally contains a Volatile Organic Compound (VOC).

Emissions of VOCs have been curtailed by local, state and federal regulations. A limit on VOC emissions either eliminates the option of electrostatic painting of polymer parts, or is a limiting factor in the capacity of a painting operation that uses VOCs to paint polymers. A method that reduces or eliminates VOCs from the electrostatic paint scheme would increase the number of parts an operation could paint in a given time.

It is desirable to provide, at relatively low cost, compounds that may dissipate charges before they accumulate to dangerous levels, or allow themselves to be electrostatically modified.

BRIEF DESCRIPTION OF THE DRAWINGS

The invention is illustrated by way of example, and not limitation, in the figures of the accompany drawings, in which.

DETAILED DESCRIPTION

A method for combining expanded graphite and polymer materials as polymer articles, and a method of making polymer articles is disclosed. According to one embodiment, the expanded graphite in the molded polymer material enables an electrostatic change to be made to the surface of the polymer material. In another embodiment, the expanded graphite combined with the polymer material allows the polymer material to act as an electrostatic discharge material.

Reference will now be made to drawings wherein like structures will be provided with like reference designations. In order to show the structures and techniques most clearly, the drawings included herein are diagrammatic representations of the indicated structures and techniques. Thus, the actual appearance of the fabricated structures, for example in a photograph, may appear different while still incorporating the essential structures and techniques described herein. Moreover, the drawings show only the structures and techniques necessary to understand what is claimed. Additional structures known in the art have not been included to maintain the clarity of the drawings.

Figure 1:
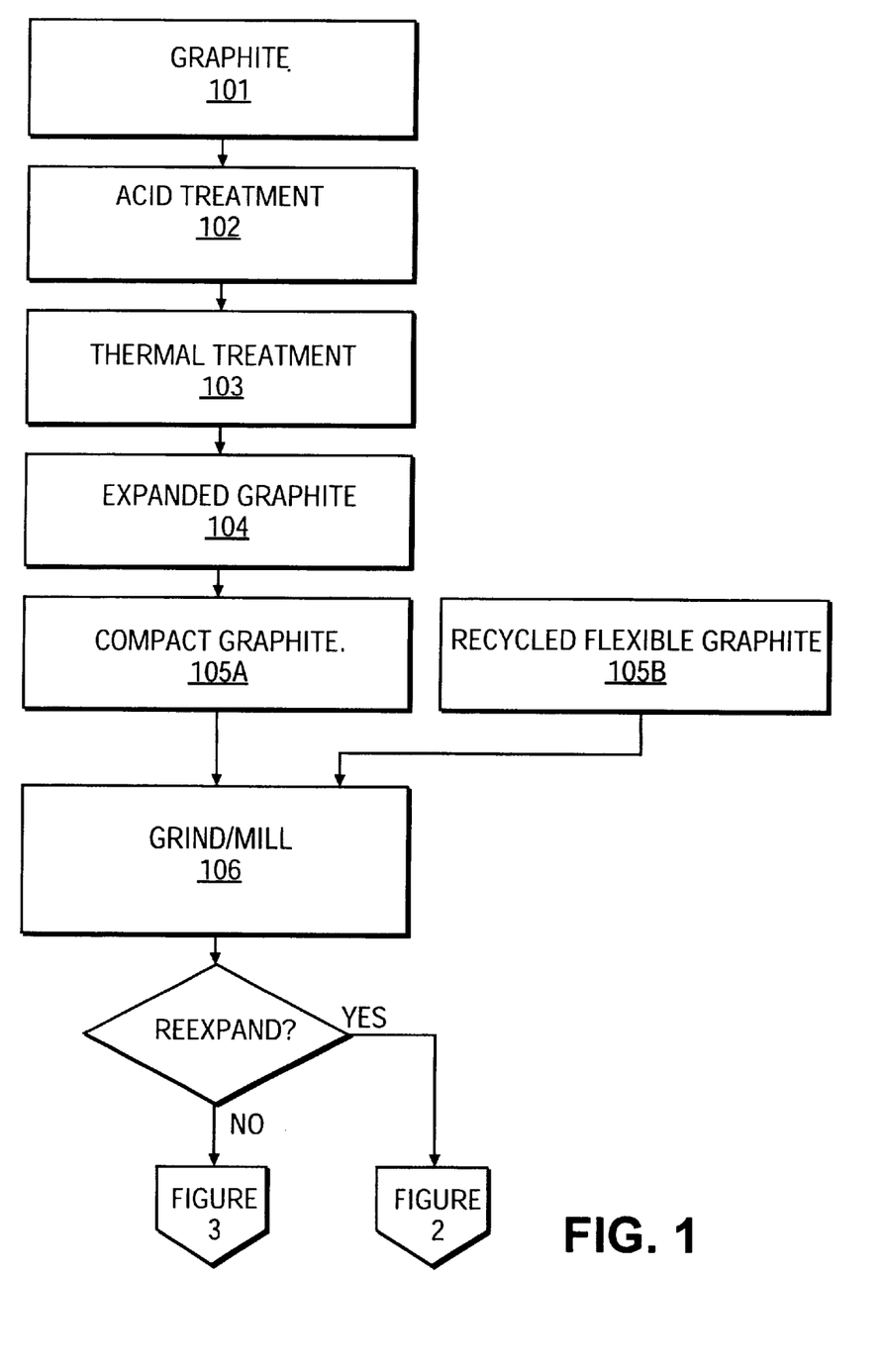
FIG. 1 is a flow diagram representing one method of forming ground expanded graphite.

Graphite containing polymers can be made from newly manufactured natural or synthetic expanded graphite material, flexible graphite material or, without major detriment, recycled expanded or flexible graphite material as a starting material. FIG. 1 is a flow diagram representing one method of forming ground expanded graphite. In this example, graphite at block 101 is mined from the earth. The graphite can be 30 to 400 mesh, preferably 50 to 100 mesh, and more preferably 50 to 80 mesh.

Expanded graphite is generally produced by combining graphite with an intercalation agent. The most common intercalation agent is concentrated sulfuric acid often mixed with a strong oxidizer like nitric acid or hydrogen peroxide. The quantity of acid should be just enough to wet the graphite, but not enough to make graphitic acid.

In addition to the acid treatment, expanded natural graphite (also described as graphite vermiculite or graphite worms) is generally obtained by the exposure of soaked graphite to heat of more than 200° C. as seen in block 103. Common graphite expansion operations work at temperature levels of 800–1100° C. Graphite typically expands at these temperature levels 100–150 times from a bulk density on the order of 0.5 grams per cubic centimeters (g/cc) to a bulk density on the order of 0.003–0.005 g/cc. Expanded graphite is a flaky, high crystalline form of graphite.

Utilizing expanded graphite presents challenges in that, in its expanded state, the extremely low bulk density makes the material difficult to process into articles and difficult to transport. Accordingly, the expanded graphite flakes are generally compressed or compacted prior to use. The compacted expanded graphite is generally referred to as "flexible" graphite as shown in block 105A of FIG. 1. Alternately, the compacting operation may be skipped and the process proceeds as described below with grinding/milling.

Recycled flexible graphite can also be used alone or in combination with newly processed or virgin graphite. Recycled flexible graphite includes flexible graphite that had been produced for some other purpose, or used in some other process, that at the point of use as described herein may otherwise be considered waste. It may exist in a flexible (e.g. compacted) form or as expanded recycled graphite that may be compressed. Block 105B of FIG. 1 describes the inclusion of recycled graphite in the operation described in FIG. 1.

As shown in FIG. 1, the virgin flexible graphite of block 105A or the recycled flexible graphite of block 105B is ground/milled as shown in block 106. According to one embodiment, following compacting, as shown in block 105A, the flexible graphite is ground and/or milled to a fine powder having a particle size on the order of about one to 1000 microns, and a tap density of approximately 0.05 to 0.20 grams per cubic centimeters (g/cc) as shown in block 106, preferably within the range of five to 500 micron with a tap density of 0.05 to 0.15 g/cc. Somewhat smaller or larger particle size can be used as well. Where recycled flexible graphite is used, the recycled graphite may be ground or milled to a particle size on the order of about 200 to 700 microns, and a tap density of approximately 0.1 to 0.3 g/cc. The virgin or recycled flexible graphite can be ground in a cone mill grinder or hammer mill grinder or other grinder known in the art. The following paragraphs describe one suitable grinding and milling operation.

Figure 2:
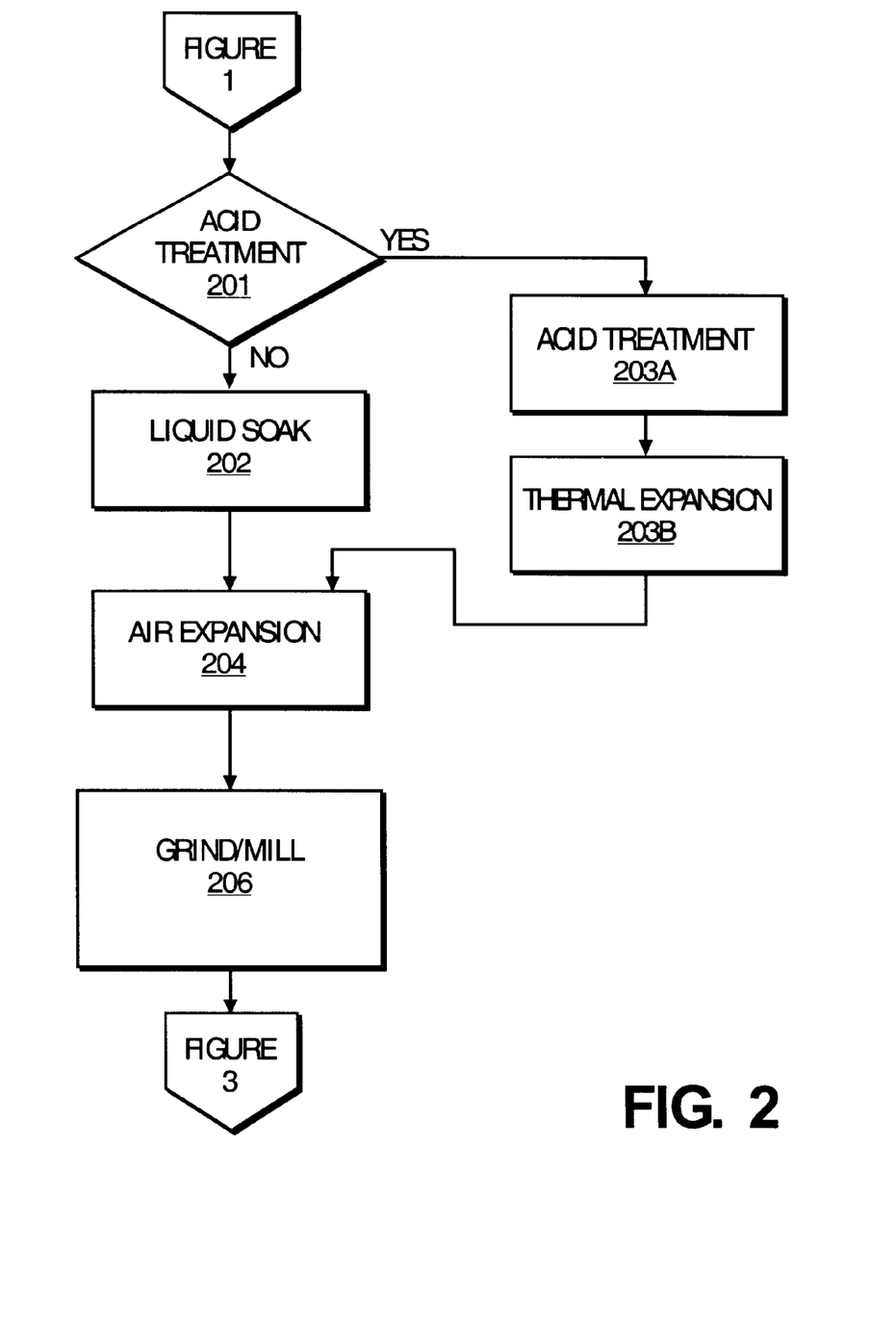
FIG. 2 is a flow diagram representing an optional method of re-expanding ground graphite.

If after grind/mill, the graphite is to be re-expanded, the process proceeds at FIG. 2. It is possible however, to proceed directly to pelletizing at FIG. 3.

Virgin or recycled flexible graphite in sheets of, for example, approximately one foot (about 30 centimeters) on a side are placed into a shredder. An example of a suitable shredder includes a Jabed Tech. shredder. This shredder has a series of gears and teeth that reduce the graphite sheets to a size of about one inch (about 2.5 centimeters) square.

Once through the shredder, the graphite is put into a rotary grinder. An example of a suitable rotary grinder is a 1831K commercially available from Rapid Granulator of Rockford, Ill. This rotary grinder has a cylinder lying on its side. Inside the cylinder is a tri-vaned impeller or rotor. The rotor moves the graphite pieces along the wall of the cylinder where they come in contact with knives set in the sides of the cylinder. The combination of the vanes and the knives cut the graphite into pieces of about ¼ to ⅛ inch (about 0.6 to 0.3 centimeters). A screen at the bottom of the cylinder retains the graphite within the cylinder while the pieces are greater than ¼ inch in size. Once the pieces are cut down to less than ¼ inch, they pass through the screen and out of the rotary grinder.

After the graphite pieces leave the rotary grinder, they are sent to the pin mill. An example of a suitable pin mill is a KEK34 commercially available from Kemtech of Cheshire, Canada. This pin mill is a drum containing a set of rotating pins arranged along the circumference of a circle with a smaller diameter than that of the drum. The position and size of the pins along with their rotation speed break the graphite into particles in the size range of 300 to 1000 microns.

From the pin mill, the graphite particles enter an air mill. An example of a suitable air mill is a MICROFET MT24 commercially available from ALTET of Pennsylvania. This air mill is a vertical chamber into which the graphite particles are placed. Jets introduce air at about 120 pounds per square inch into the bottom of the mill with velocities of approximately 500 cubic feet per minute. These air jets keep the graphite particles suspended in the chamber where collisions with other particles finally mill the graphite down to a size of about 10 microns. A sifter wheel at the top of the chamber, spinning at about 5000 revolutions per minute, allows the approximately 10 micron graphite particles to exit the mill.

FIG. 2 is a flow diagram representing an optional method of re-expanding ground/milled graphite according to one embodiment. The re-expansion can be effected by acid treatment or liquid soak. An acid treatment decision made at block 201 will result in an acid treatment at block 203A. The acid is an intercalation agent. The most common intercalation agent is concentrated sulfuric acid often mixed with an oxidizer like nitric acid or hydrogen peroxide.

After the acid treatment, expanded graphite is generally obtained by the exposure of soaked graphite to heat of more than 200° C. as seen in block 203B, typically temperature levels of 800–1100° C.

A liquid soak decision made at block 201 in FIG. 2 results in the graphite soaking in a wetting agent in block 202. In one embodiment the wetting agent can be a cryogenic liquid. One commonly used cryogenic liquid is liquid nitrogen. In another embodiment, the soaking agent can be water.

When water is used as the soaking agent, the powdered graphite particles are metered through a feeder into a high speed continuous blender. Simultaneously, water possibly containing at least a surfactant is metered into the high speed continuous blender allowing the graphite particles to absorb the moisture needed for thermal expansion at block 202.

The liquid soak and acid treatment paths remerge at block 204, air expansion. Generally, the graphite is introduced to hot air that causes expansion of the graphite. The air is generally above 200° C. One example is a 540,000 British Thermal Units (BTU) gas fired tube furnace with an operating temperature above 500° C., and preferably between 800° C. and 1100° C., as shown in block 204. Graphite typically expands at these temperatures 100–150 times.

According to one embodiment, following air expansion, as shown in block 204 of FIG. 2, the expanded graphite is ground or milled to a fine powder having a particle size on the order of about 1 to 1000 microns, and a tap density of approximately 0.05 to 0.20 g/cc. preferably within the range of 5 to 500 micron with a tap density of 0.1 to 0.15 g/cc as shown in block 206. If desired, the expanded graphite can be ground in a cone mill grinder or hammer mill grinder or other grinder known in the art, as described herein above.

Figure 3:
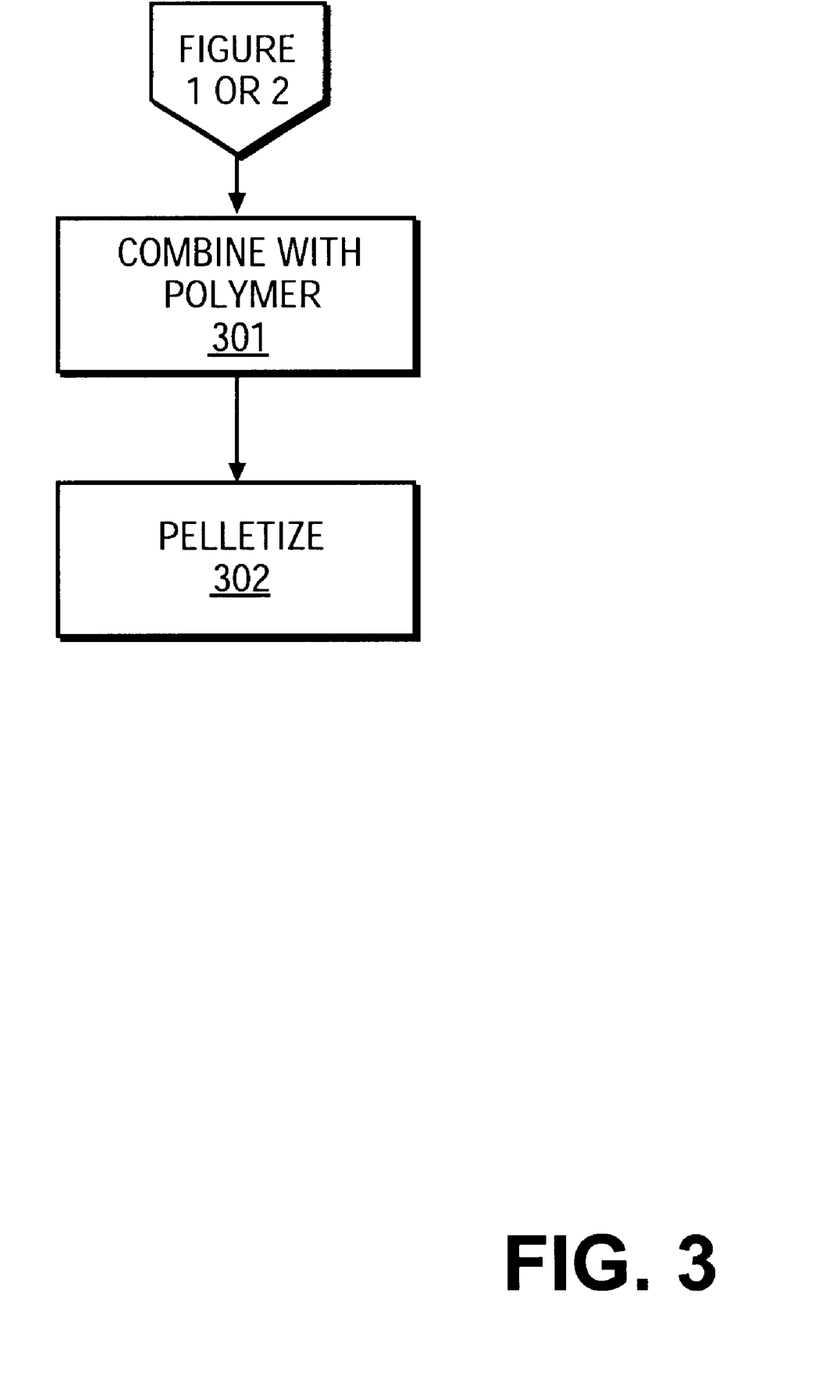
FIG. 3 is a flow diagram representing one method of combining the expanded graphite with a polymer and pelletizing the combination.

Following grinding and/or milling, the expanded graphite (including the optionally re-expanded graphite material) is introduced to a moldable polymer and combined to make a moldable polymer material, as referenced in block 301 of FIG. 3. Suitable polymers include thermoplastic and thermoset polymers. In this regard, the polymer material comprises expanded graphite and polymer as a polymerized product, a combination or a mixture. The introduction takes place for example, in a heated mixing chamber that has a screw impeller to force the two materials into contact with each other while heating them to allow mixing of the expanded graphite and the moldable polymer into a moldable polymer material. In this example, the moldable polymer material is then pushed through an extruder, that pelletizes the material, as shown in block 302, by the screw impeller. The expanded graphite and the polymer can be combined by mixing together in a tubular mixer and heating the mixer while a large screw impeller, such as a KMD 90–26 extruder commercially available from Mannesmann-Demag-Krauss-Maffei of Munich, Germany, mixes the combination and extrudes the combined material through a pelletizer.

Suitable polymers for the operation described with reference to FIG. 3 include, but are not limited to, thermoplastic resins. The thermoplastics include but are not limited to polyphenylene sulfide (PPS), nylon (e.g. nylon66), polycarbonate (PC), polyphenylene oxide (PPO), acrylonitrile butadiene styrene (ABS), polypropylene (PP), high density polyethylene (HDPE) and thermoplastic olefin (TPO). Suitable polymers also include the thermoset type, such as phenolic resin (e.g. resol-type or Novolac-type resin).

Graphite combines well with polymer materials. Combinations of graphite and polymer can run the full spectrum of weight ratios from one percent graphite to 99 percent graphite. Of particular interest are those graphite polymer weight ratios yielding one to 20 percent graphite.

Prior to pelletizing to combine expanded graphite with polymer in FIG. 3, expanded graphite, or a mixture of expanded graphite and polymer, can be combined with a filler. Suitable fillers include, but are not limited to at least one of the following: carbon black, carbon fibers, mineral fillers including, but not limited to talc, re-expanded graphite, recycled expanded graphite, glass, carbon nanotubes, clay, synthetic graphite, stainless steel fibers and aluminum or copper flake. The carbon fibers used as a filler with expanded graphite include but are not limited to polyacrylnitrile (PAN) fibers, pitch carbon fibers and rayon-based carbon fibers.

Figure 4:
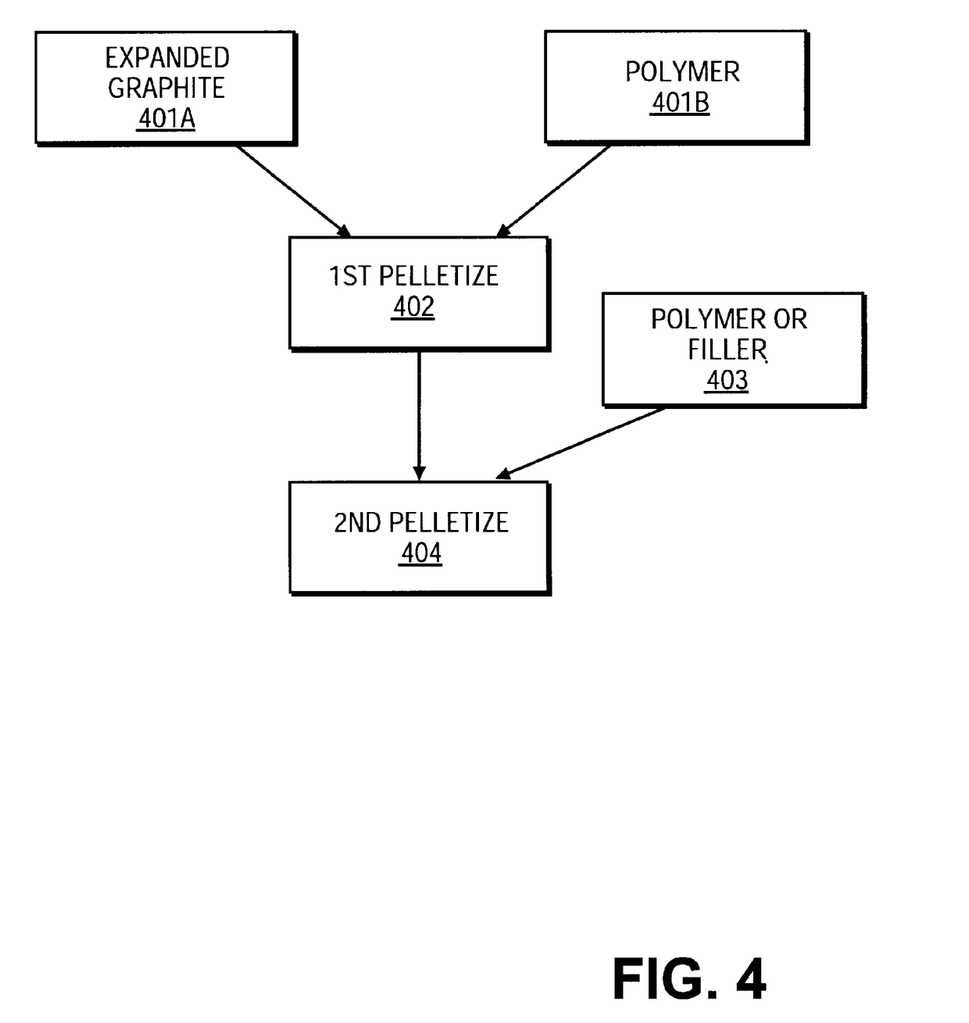
FIG. 4 is a flow diagram representing an alternate method of combining the expanded graphite with a polymer.

FIG. 4 illustrates an alternative pelletizing embodiment. Expanded graphite at block 401A is combined with a polymer and/or filler, as mentioned above, from block 401B. The pellets (premix) produced at block 402, in one embodiment, can be 30 percent expanded graphite and 70 percent polymer. Premixing the expanded graphite in a polymer, filler mix reduces the dust generated by handling expanded graphite. For example, a manufacturer of polymer pellets (e.g. a compactor) or a manufacturer of polymer components may desire to receive expanded graphite from a graphite supplier in a form that is generally free of graphite dust, such as a premix of polymer and expanded graphite. Additional polymer or filler at block 403 can be combined with the pelletized expanded graphite polymer/filler mix from block 402. The pellets derived from block 404, in one embodiment can be approximately one to 20 percent (e.g. 10 percent) expanded graphite, and ready for molding.

Figure 5:
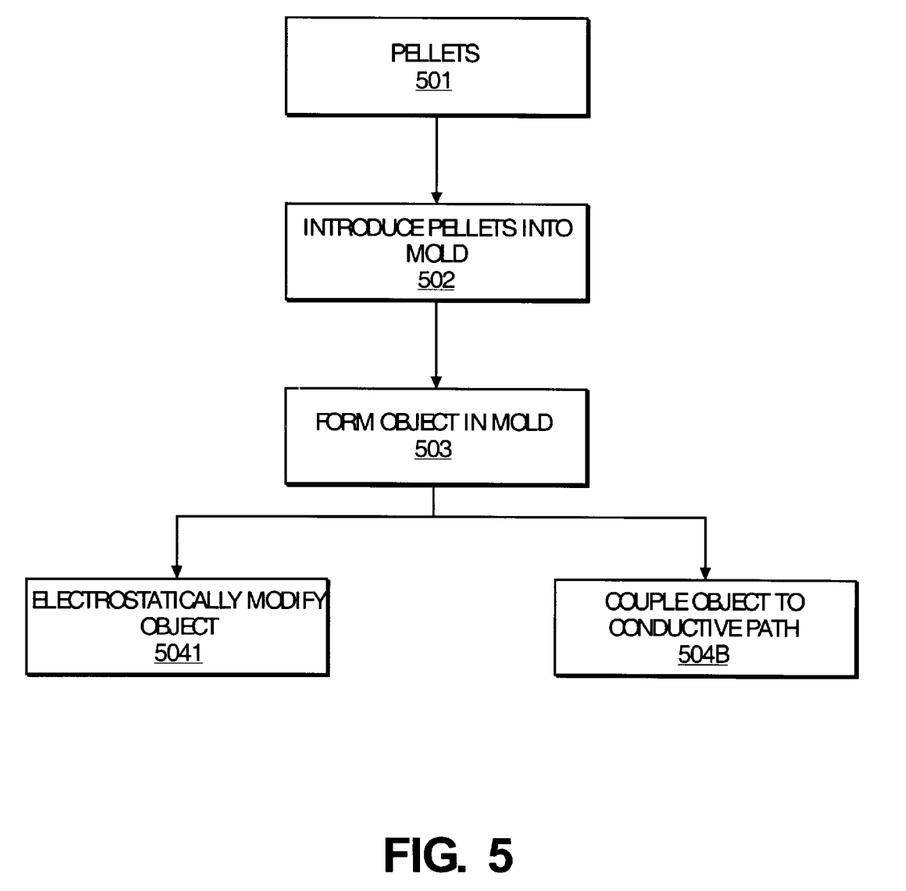
FIG. 5 is a flow diagram representing one method of forming polymer objects from graphite polymer pellets.

FIG. 5 is a flow diagram representing one method of forming polymer material articles or objects from polymer material pellets formed according to the techniques described above. The basic methods of molding a polymer into an article or object are injection molding, blow molding and compression molding. Injection molding is typically used for forming thermoplastic polymers into solid objects. Blow molding is typically used to form hollow objects out of thermoplastic materials. Compression molding is typically used to form solid objects out of thermoset polymers. Other suitable molding techniques include, but are not limited to, injection compression molding, roto-molding and sheet molding.

Injection molding begins by placing a polymer (e.g., a thermoplastic polymer material including expanded graphite) in a chamber that can be heated and compressed, as shown in block 502. As the polymer material is heated until it softens and turns liquid, the chamber is compressed so the polymer material is forced to enter a mold held adjacent to the chamber. Compression is applied to the heated chamber until the liquid polymer material fills the mold, as shown in block 503. When the polymer material cools, the mold is opened and the solid polymer material object is removed from the mold.

Blow molding begins with a molten tube of polymer material, derived for example from the polymer material pellets described above, that is placed in a mold, as shown in block 502. Compressed air is introduced into the tube of polymer material, causing the tube to expand until it fills the confines of a blow mold, as shown in block 503. When the polymer cools, the blow mold is opened and the hollow polymer material object is removed.

Compression molding begins with an open mold and an amount of polymer material, derived for example from the polymer material pellets described above, placed in the mold. The mold is closed confining the polymer material within the mold, as shown in block 502. The mold compresses the polymer material forcing it to fill the contours of the mold. While the mold is closed, it is heated causing the polymer material to undergo a chemical change that permanently hardens the polymer material into the shape of the mold, as shown in block 503. When the polymer material cools, the mold is opened and the polymer material object is removed.

Alternative molding techniques include extruding the polymer material into the desired object. Examples of this technique include, but are not limited to, pipes and plates.

Following molding, a conductive polymer material object can have its surface electrostatically modified, because it can carry current away or hold a charge, as shown in block 504a of FIG. 5. In one example, a conductive polymer material object can have its surface painted electrostatically. A voltage element can give a conductive polymer object a charge. A painting element can give paint an opposite charge. The differences in charge will impel the paint to come in contact with the object, where the paint adheres to the object surface, coating the object in paint.

Figure 6:
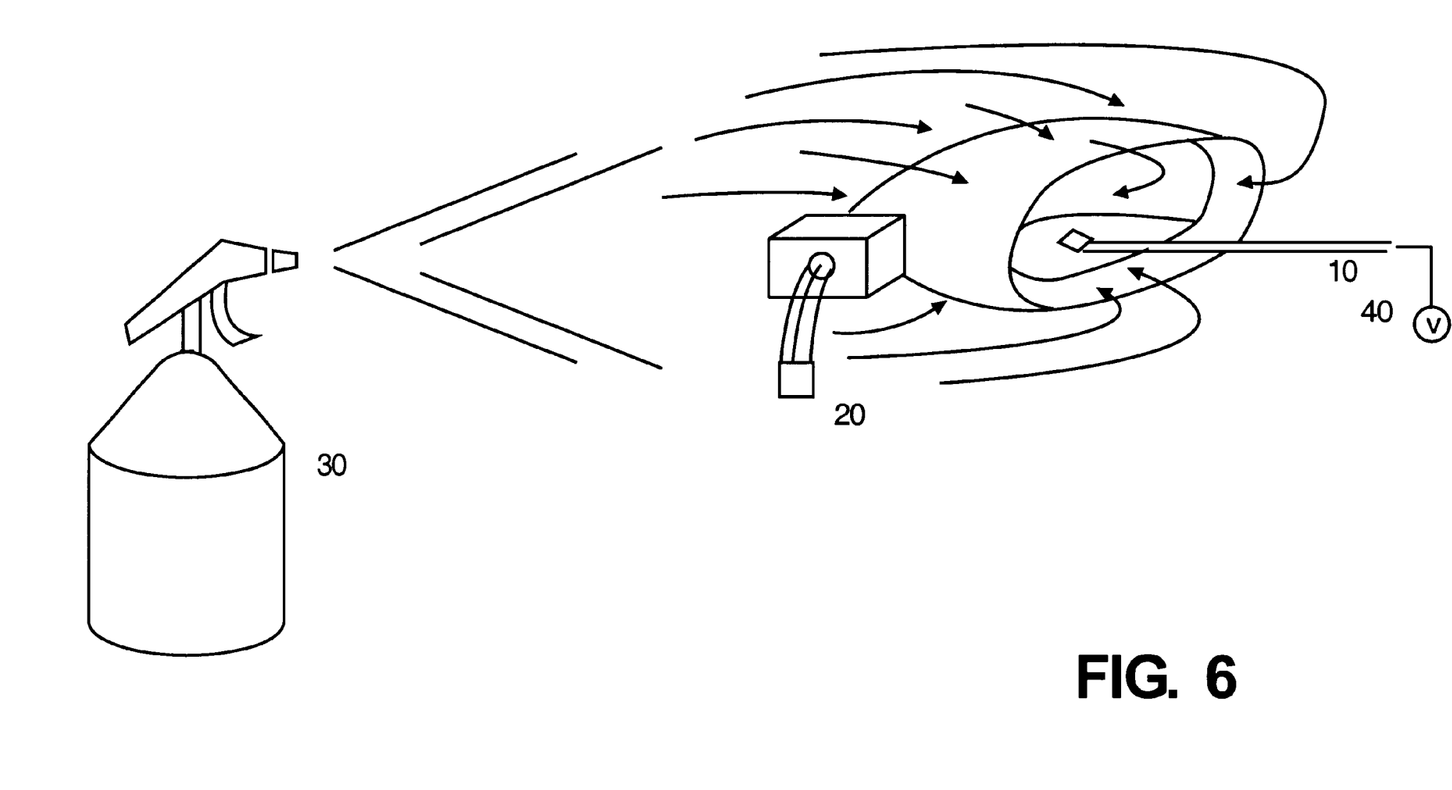
FIG. 6 is an illustration of one method of providing a floor with an electrostatic dissipative ability.

FIG. 6 illustrates an electrostatic painting operation to alter the surface of a polymer material. The surface altering operation, taking place on the surface of the polymer material, is that of painting. Molded polymer material object 20 that is mixed with expanded graphite in the illustrated example is a mirror shroud for an automobile. Molded polymer material object 20 is attached to conductive path 10. Conductive path 10 is coupled to voltage source 40 which allows a charge to build up on the surface of molded polymer material object 20. Molded polymer material object 20 made of a conductive polymer allows the object to conduct electricity.

In an electrostatic painting environment such as shown in FIG. 6, electrostatic paint sprayer 30 impels small droplets of paint, or small amounts of electrostatically charged powdered paint, toward oppositely charged molded polymer material object 20. In this electrostatic environment the paint strikes the surface of the polymer object and adheres thereto.

The attraction of the paint particles in the electrostatic painting operation in FIG. 6 to the surface of molded polymer material object 20, allows a uniform distribution of paint on the surface of molded polymer material object 20. Molded polymer material comprising at least five percent expanded graphite is sufficiently conductive to accomplish an electrostatic painting process according to current technologies. Acceptable results were achieved with polymer material objects comprising at least five percent expanded graphite. Additionally, the electrostatic painting operation allows a reduction of the quantity of paint used to achieve a given thickness of paint uniformly distributed on molded polymer material object 20.

For example in FIG. 6, a typical electrostatic painting operation for a nonconductive polymer object employs a conductive primer over the molded polymer object. This operation typically requires one primer coat, two base coats and two clear coats to cover a nonconductive polymer object. Experimental studies indicate that the primer coat, to electrostatically paint an object of a conductive polymer material as described herein, can be reduced by 20 to 25 percent in most instances, and in some cases the primer can be eliminated altogether. Additionally these studies show, consumption of paint in the base and clear coats is reduced by 20 to 25 percent with such conductive polymer objects as well.

A third benefit of the conductive polymer material object described in FIG. 6 is the electrostatic lines of force developed within the electrostatic painting operation between the paint gun and the conductive polymer material object to be painted, permit elements of paint to avoid striking the forward surface of molded polymer material object and wrap around a far edge to strike a non-obvious, and even shadowed, area of the surface enabling a more uniform coverage of paint on the conductive polymer material object then can be achieved with a non-conducting surface. In the example of the mirror shroud shown in FIG. 6, a portion of the paint directed by the paint gun at the exterior of the shroud will wrap around the exterior and adhere to the inner walls. For mirror shrouds housing a recessed mirror, where a conductive polymer material object is painted the ability to pain the inner walls offers an attractive benefit.

Figure 7:
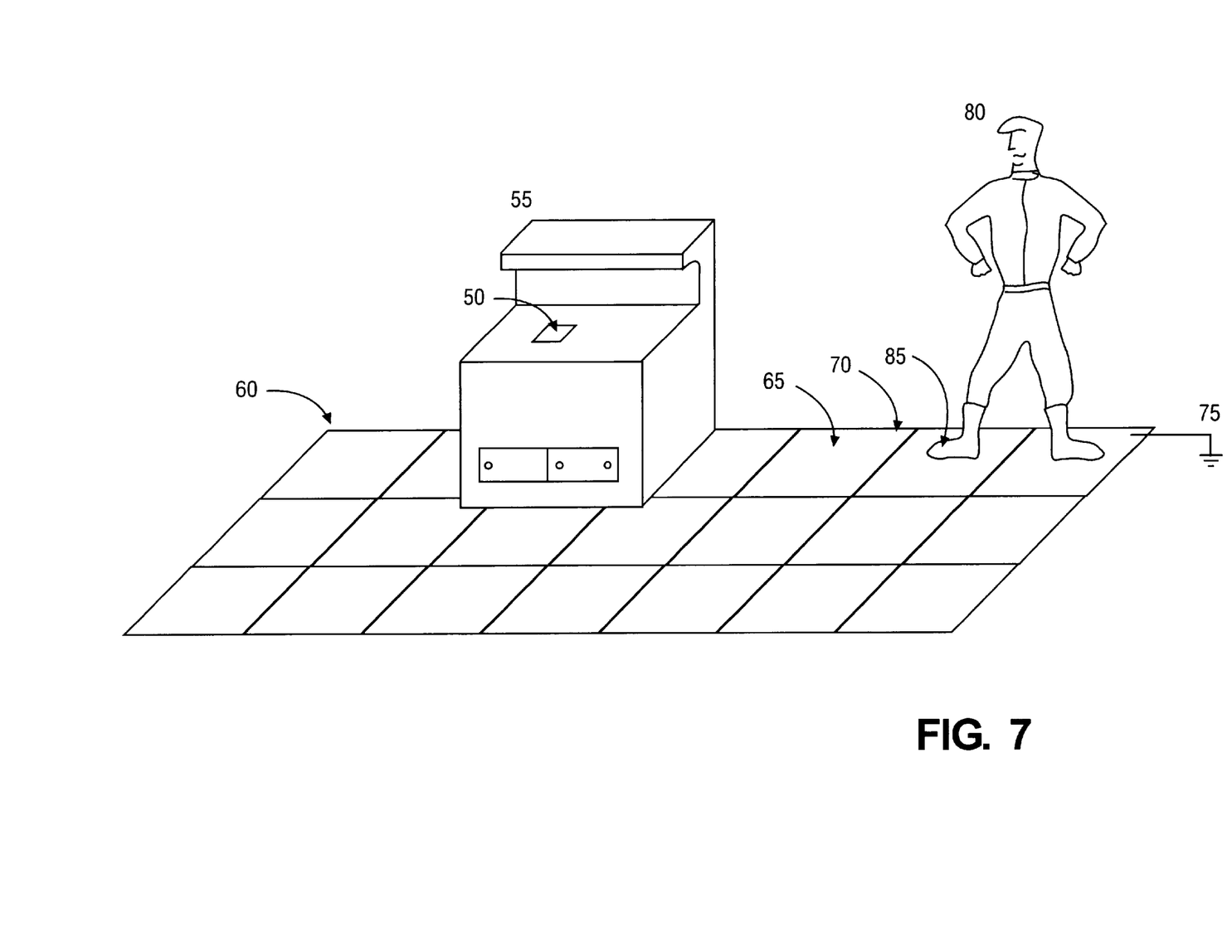
FIG. 7 is a flow diagram of one method of forming and electrostatically modifying a conductive polymer.

FIG. 7 illustrates another embodiment of the described conductive polymer material. This embodiment is an electrostatic dissipative clean room floor. For example, multiple integrated circuit chips can be contained in chip tray 50. Chip tray 50 rests on an example of a typical clean room bench 55. Typical clean room bench 55 is constructed of conductive elements, so it can bleed off electrostatic charge. A conductive path is made between chip tray 50 and typical clean room bench 55, merely by placing chip tray 50 on clean room bench 55. Typical clean room bench 55 is placed on clean room floor 60 extending the conductive path from chip tray 50 to clean room floor 60.

In FIG. 7 clean room floor 60, in this example, comprises conductive polymer material floor panels 65, and conductive frame 70. Conductive polymer material floor panels 65 fit into conductive frame 70, and conductive frame 70 supports conductive polymer material floor panels 65. In this example, electrostatic energy travels from one conductive floor panel to another through the conductive frame. Clean room floor 60 is coupled to ground 75, thus allowing the electrostatic charge to travel from chip tray 50 to ground 75 through a path made of typical clean room bench 55 to clean room floor 60 through successive conductive floor panels 70.

In FIG. 7 human 80 is provided to show scale. Human 80 is connected to the ground path by way of conductive booties 85. Suitable conductive polymer material floor panels include at least five percent graphite material.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
   combining a polymer and one to 20 percent expanded graphite;
   pelletizing the combination;
   forming an object; and
   coupling the object to a conductive path.

2. The method of claim 1, wherein;
pelletizing comprises extruding.

3. The method of claim 1, further comprising;
prior to pelletizing, combining the expanded graphite with a filler of at least one of carbon black, carbon fibers, mineral filler, re-expanded graphite, and recycled expanded graphite.

4. The method of claim 3, wherein;
the carbon fibers are at least one of polyacrylnitrile fibers, pitch carbon fibers and rayon-based carbon fibers.

5. The method of claim 1, wherein said polymer material is one of a thermoset material and a thermoplastic material.

6. A method comprising:
pelletizing a polymer material with one to 20 percent expanded graphite;
introducing the pellets into a mold, wherein introducing the pellets into the mold further comprises forming a molded object;
coupling the molded object to a conductive path; and
wherein the amount of graphite is sufficient to conduct electricity.

7. The method of claim 6, wherein said polymer material is one of a thermoset material and a thermoplastic material.

8. The method of claim 6, wherein introducing the pellets into the mold is achieved by injection molding.

9. The method of claim 6, further comprising electrostatically modifying the surface of the molded object.

10. The method of claim 9, wherein the modifying comprises painting.

11. The method of claim 10, wherein the painting comprises primerless painting adherence to the object.

12. The method of claim 6, further comprising;
prior to pelletizing, combining the expanded graphite with a filler of at least one of carbon black, carbon fibers, mineral filler, glass, re-expanded graphite, and recycled expanded graphite.

13. The method of claim 6, wherein:
the carbon fibers are at least one of polyacrylnitrile fibers, pitch carbon fibers and rayon-based carbon fibers.

14. The method of claim 6, wherein the polymer material is combined with five to 10 percent expanded graphite.

15. The method of claim 6, wherein the polymer material is combined with seven to 10 percent expanded graphite.

16. A method comprising:
providing a molded polymer comprising one to 20 percent expanded graphite; and
coupling said molded polymer to a conductive path.

17. The method of claim 16, wherein said polymer material is one of a thermoset material and a thermoplastic material.

18. The method of claim 16, further comprising after coupling the molded polymer material to the conductive path, electrostatically modifying the surface of the polymer material.

19. The method of claim 18, wherein the modifying comprises painting.

20. The method of claim 19, wherein the painting comprises primerless painting adherence to the polymer.

21. The method of claim 16, wherein the polymer material is combined with one to 10 percent expanded graphite.

22. The method of claim 16, wherein the polymer material is combined with six to 10 percent expanded graphite.

23. A method comprising:
pre-compressing expanded graphite;
milling the pre-compressed expanded graphite;
combining the milled expanded graphite in an amount of one to 20 percent with a polymer material;
pelletizing the combination;
forming an object of the combined graphite and the polymer material; and
coupling the object to a conductive path as part of an electrostatic operation.

24. The method of claim 23, wherein said polymer material is one of a thermoset material and a thermoplastic material.

25. The method of claim 23, further comprising after coupling the object to the conductive path, electrostatically modifying the surface of the object material.

26. The method of claim 25, wherein the modifying comprises painting.

27. The method of claim 25, wherein painting comprises primerless painting adherence to the object.

28. The method of claim 23, wherein the polymer material is combined with one to 10 percent expanded graphite.

29. The method of claim 23, wherein the polymer material is combined with six to 10 percent expanded graphite.

30. The method of claim 23, further comprising;
prior to combining the expanded graphite and the polymer, the expanded graphite is combined with a filler of at least one of carbon black, carbon fibers, mineral filler, glass, re-expanded graphite and recycled expanded graphite.

31. The method of claim 23, wherein;
the carbon fibers are at least one of polyacrylnitrile fibers, pitch carbon fibers and rayon-based carbon fibers.

32. An apparatus comprising:
an injection molded polymer material comprising one to 20 percent expanded graphite that is connectable to a conductive path.

33. The apparatus of claim 32, wherein said polymer material is one of moldable thermoset material and moldable thermoplastic material.

34. The apparatus of claim 32, wherein the polymer material comprises five to 10 percent expanded graphite.

35. The apparatus of claim 32, wherein the polymer material comprises seven to 10 percent expanded graphite.

* * * * *